(12) United States Patent
Kawai

(10) Patent No.: US 8,168,918 B2
(45) Date of Patent: May 1, 2012

(54) LASER WELDING SYSTEM AND LASER WELDING CONTROL METHOD

(75) Inventor: Hitoshi Kawai, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1096 days.

(21) Appl. No.: 11/302,514

(22) Filed: Dec. 14, 2005

(65) Prior Publication Data

US 2006/0157455 A1    Jul. 20, 2006

(30) Foreign Application Priority Data

Dec. 16, 2004   (JP) ................................. 2004-364079

(51) Int. Cl.
*B23K 26/00* (2006.01)

(52) U.S. Cl. ........... 219/121.63; 219/121.6; 219/121.64; 219/121.77; 219/121.8; 219/121.83; 901/8; 901/10; 901/15; 901/28; 901/42

(58) Field of Classification Search ............... 219/121.6, 219/121.63, 121.64, 121.78, 121.79, 121.8, 219/121.85, 121.74, 121.77, 121.83, 132, 219/121.81; 901/42, 8, 10, 15, 16, 20, 28
See application file for complete search history.

(56) References Cited

U.S. PATENT DOCUMENTS

| | | | | |
|---|---|---|---|---|
| 5,466,909 A | * | 11/1995 | Nihei et al. | 219/121.72 |
| 5,665,255 A | * | 9/1997 | Busuttil | 219/121.63 |
| 6,100,497 A | | 8/2000 | Maruyama et al. | |
| 6,153,853 A | | 11/2000 | Maruyama et al. | |
| 6,531,675 B2 | * | 3/2003 | Faitel | 219/121.63 |
| 6,770,839 B2 | * | 8/2004 | Mangiarino et al. | 219/121.63 |
| 7,560,659 B2 | | 7/2009 | Menin | |
| 2002/0104833 A1 | * | 8/2002 | Bradley | 219/121.63 |
| 2003/0146198 A1 | | 8/2003 | Feistel et al. | |
| 2004/0111185 A1 | | 6/2004 | Gmeiner | |
| 2006/0175301 A1 | | 8/2006 | Rippl | |
| 2009/0230100 A1 | | 9/2009 | Menin | |

FOREIGN PATENT DOCUMENTS

| | | |
|---|---|---|
| CN | 1151925 A | 6/1997 |
| EP | 1 568 436 A1 | 8/2005 |
| EP | 1 600 244 A1 | 11/2005 |
| JP | 57-86089 U | 5/1982 |
| JP | 06-328277 A1 | 11/1994 |
| JP | 9-122945 A | 5/1997 |
| JP | 09192869 A * | 7/1997 |

(Continued)

OTHER PUBLICATIONS

JP_09192869_A_H.pdf machine translation.*

*Primary Examiner* — Henry Yuen
*Assistant Examiner* — Ket D Dang
(74) *Attorney, Agent, or Firm* — Foley & Lardner LLP (57) ABSTRACT

A laser processing head mounted on a robot arm moves from with a constant speed in a direction from a welding point to a next welding point, while a reflection mirror continuously turns in order to maintain laser beams focused on the welding point until the welding at the welding point is completed, and the reflection mirror quickly turns to shift the focus of the laser beams onto the next welding point when the welding at the welding point is completed.

3 Claims, 9 Drawing Sheets

FOREIGN PATENT DOCUMENTS

| | | |
|---|---|---|
| JP | 10-180472 A | 7/1998 |
| JP | 11-114689 A | 4/1999 |
| JP | 11-156569 A | 6/1999 |
| JP | 3229834 B2 | 9/2001 |
| JP | 2004-306057 A | 11/2004 |
| JP | 2005-177862 A | 7/2005 |
| JP | 2005-334972 A | 12/2005 |
| WO | WO 2004/014594 A1 | 2/2004 |
| WO | WO 2005/009667 A1 | 2/2005 |
| WO | WO 2005/087427 A1 | 9/2005 |

* cited by examiner

FIG. 9

LASER WELDING SYSTEM AND LASER WELDING CONTROL METHOD

BACKGROUND OF THE INVENTION

1. Field of the Invention

The invention relates to a laser welding system and its control method.

2. Description of the Related Art

Laser welding technique has come to be adopted in the art of welding using robots in recent years. A laser welding technique using a robot is disclosed in Japanese Patent No. 3229834. In the disclosed technique, a turning reflection mirror is mounted on a robot arm in order to guide laser beams with the reflection mirror, and a plurality of welding points are welded continuously by means of turning the reflection mirror to direct the laser beams as needed. The most significant merit of the laser beam direction swinging by means of the reflection mirror is that the welding points can be changed from one to another with the turning of a relatively light, quick responding mirror. The laser welding using such a reflection mirror provides a better work efficiency compared to the conventional spot welding process in which a heavy welding gun has to be moved around.

SUMMARY OF THE INVENTION

However, the conventional laser welding is applicable only to a limited range in which the laser beams can be swung by the reflection mirror for changing the welding point by the motion of the reflection mirror. Therefore, if a plurality of welding points need to be welded in succession and if the position of the next welding point exceeds the range that can be covered by swinging the laser beams, or if it requires a change of the laser's irradiation direction, it is necessary to move the robot arm in any case.

Therefore, when welding points are spread out into a wide range, the frequency of moving robot arm tends to increase. Therefore, the total time required for completing welding of all the welding points using a reflection mirror and laser beams in such a case is not so different from the time required in spot welding using a conventional welding gun mounted on a robot, so that the work efficiency improvement is almost negligible.

The purpose of the present invention is to provide a laser welding control device and its control method capable of substantially improving the laser welding process.

The laser welding system according to the present invention to achieve the abovementioned objective is equipped with: a robot; a laser processing head mounted on said robot whose laser beam irradiation direction is freely changeable; and a robot controller for controlling said robot's attitude so as to move said laser processing head in a specified direction at a specified speed, said robot controller controlling said laser processing head during said motion of said laser processing head in such a way that, while welding a first welding point, said laser beams are directed toward said first welding point, and controlling the direction of laser beam irradiation of said laser processing head when said laser processing head reaches a position to start welding a second welding point after finishing the welding of the first welding point in such a way that said laser beams are directed toward the second welding point.

The laser welding control method for accomplishing the aforementioned objective according to the present invention is capable of: traveling a laser processing head in a specified direction at a specified speed by means of controlling a robot on which the laser processing head is mounted changelably laser beam's irradiation direction freely; controlling the direction of said laser beam's irradiation from said laser processing head during said traveling of said laser processing head in such a way that, while welding a first welding point, said laser beams are directed toward said first welding point, and changing said laser beam's irradiation direction in such a way that said laser beam is irradiated in a direction toward a second welding point when said laser processing head reaches a position to start welding of the second welding point after finishing welding of the first welding point.

Moreover, the laser welding system according to the present invention to achieve the abovementioned objective is equipped with: a robot; a laser beam irradiation means mounted on the robot whose laser beam irradiation direction is freely changeable; and a robot controller for controlling said robot's attitude so as to move said laser beam irradiation means in a specified direction at a specified speed, said robot controller controlling said laser beam irradiation means during said motion of said laser beam irradiation means in such a way that, while welding a first welding point, said laser beams are directed toward said first welding point, and controlling the direction of laser beam irradiation of said laser beam irradiation means when said laser beam irradiation means reaches a position to start welding a second welding point after finishing the welding of the first welding point in such a way that said laser beams are directed toward the second welding point.

DETAILED DESCRIPTION OF THE PREFERRED EMBODIMENT

The embodiments of this invention will be described below with reference to the accompanying drawings.

Figure 1:
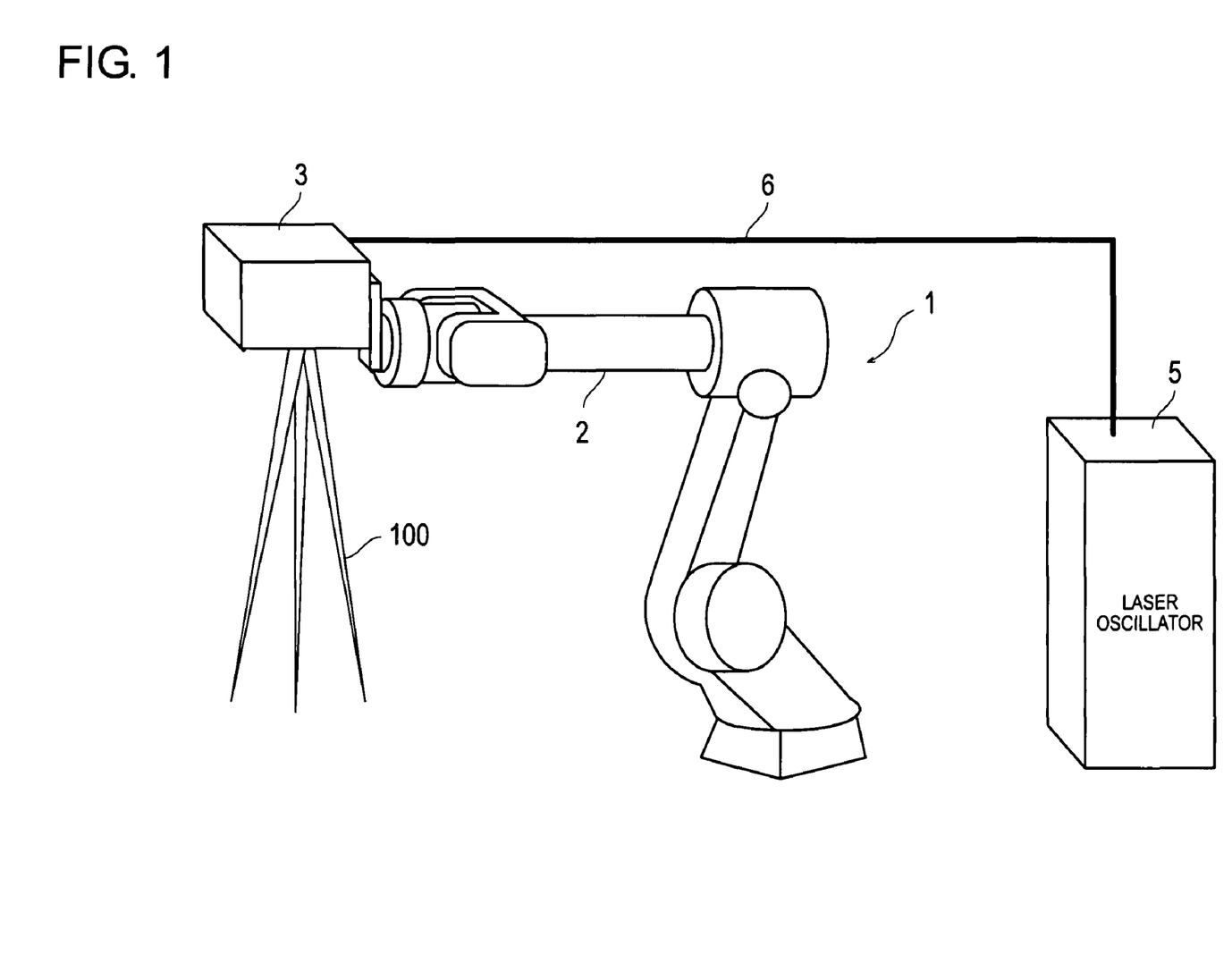
FIG. 1 is a schematic perspective drawing for describing a laser welding system to which the present invention is applied.
Figure 2:
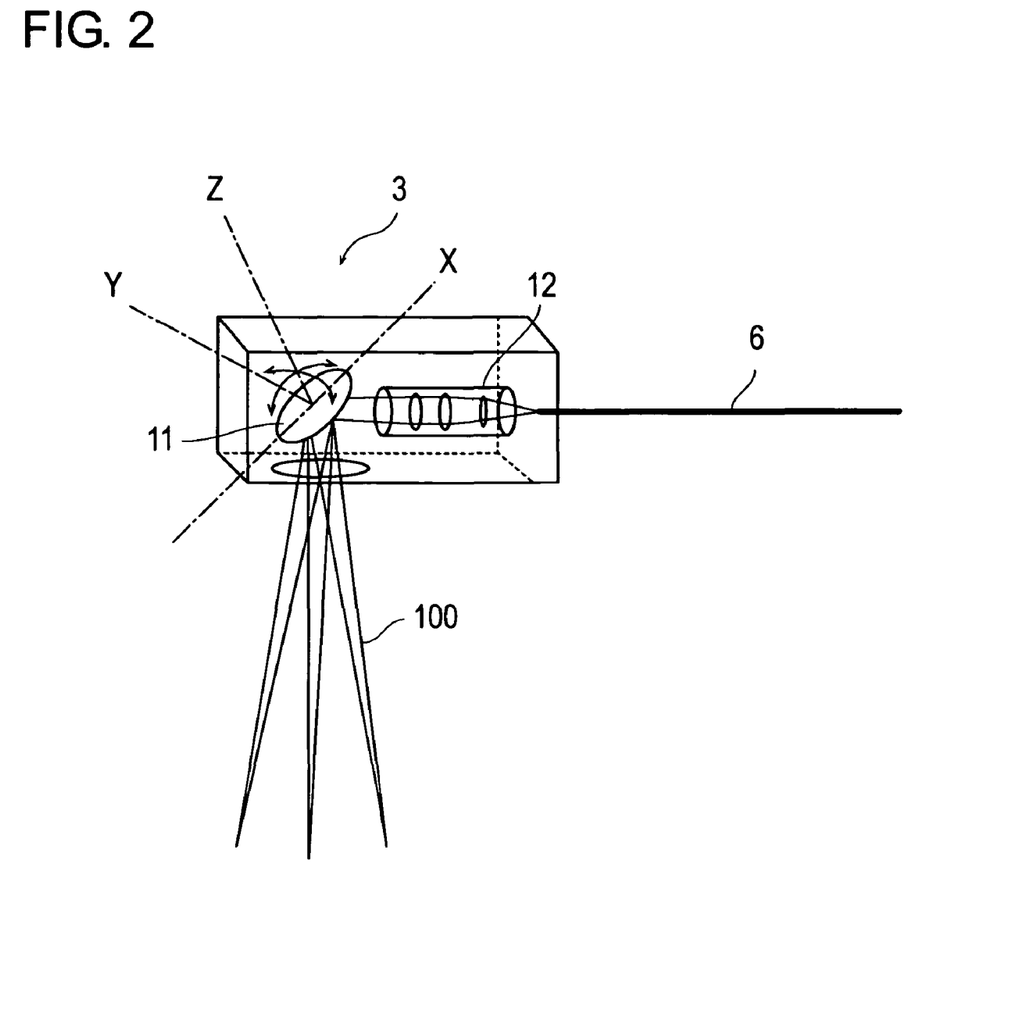
FIG. 2 is a schematic perspective drawing for describing a laser processing head.

FIG. 1 is a schematic perspective drawing for describing a laser welding system to which the present invention is applied, and FIG. 2 is a schematic perspective drawing for describing a laser processing head.

The remote welding is different from the conventional spot welding process in that the welding tool does not contact with the workpiece directly but that the workpiece is welded by laser beams from a remote place.

The laser welding system shown in FIG. 1 is a system for such a remote welding process.

The laser welding system consists of a robot 1, a laser processing head 3 that is mounted on the tip of an arm 2 of the robot 1 and irradiates laser beams 100, a laser oscillator 5 which serves as the laser beam source, and an optical fiber cable 6 that guide laser beams from the laser oscillator 5 to the laser processing head 3.

The robot 1 can be a general purpose multi-axis robot. The robot 1 moves the tip of the arm 2, i.e., the laser processing head 3, moving its attitude in accordance with an operation path provided by a teaching work.

The laser processing head 3 emits the laser beams 100 brought through the optical fiber cable 6 finally in a direction toward the target as shown in FIG. 2. Consequently, the laser processing head 3 is equipped with a reflection mirror 11 that serves as a laser beam irradiation means and a group of lenses 12 that adjusts the focal position of the laser beams 100.

The reflection mirror 11 can be turned about an X-axis and an Y-axis that intersects perpendicularly with a Z-axis, which is an axis perpendicular to the mirror surface, in order to be able to swing arbitrarily the irradiating direction of the laser beams 100 by such turnings. Therefore, a motor and a gear mechanism (not shown) are provided in the laser processing head 3 for turning the reflection mirror 11. The motor's motion is controlled by a processing head controller, which will be described later. Similarly, a motor is provided for the group of lenses 12 in order to adjust the focal position by means of the processing head controller.

The laser oscillator 5 is a YAG laser oscillator. The YAG laser is used to guide the laser beams by means of the optical fiber cable 6. In addition to it, carbon dioxide gas laser can be used for the remote welding process. If carbon dioxide gas laser is used, the laser beams have to be guided from the laser oscillator 5 to the laser processing head 3 by means of reflection mirrors and prisms, not the optical fiber cable 6. Any type of laser beams can be used for the present invention as long as they can be used for the remote welding process. Therefore, either optical fiber cables or reflecting mirrors can be used for the guiding route to suit the type of laser beams used.

Figure 3:
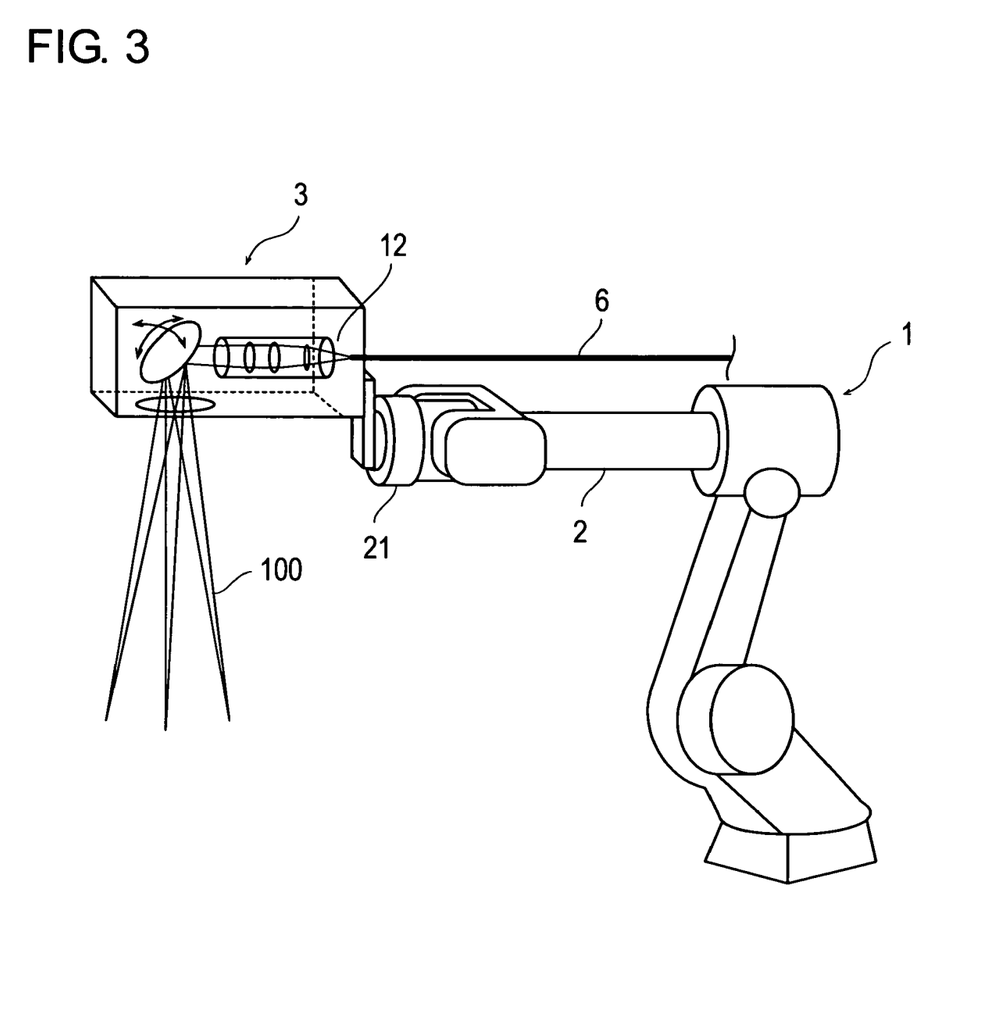
FIG. 3 is a drawing of an example showing how a laser processing head can be mounted on a robot.
Figure 4:
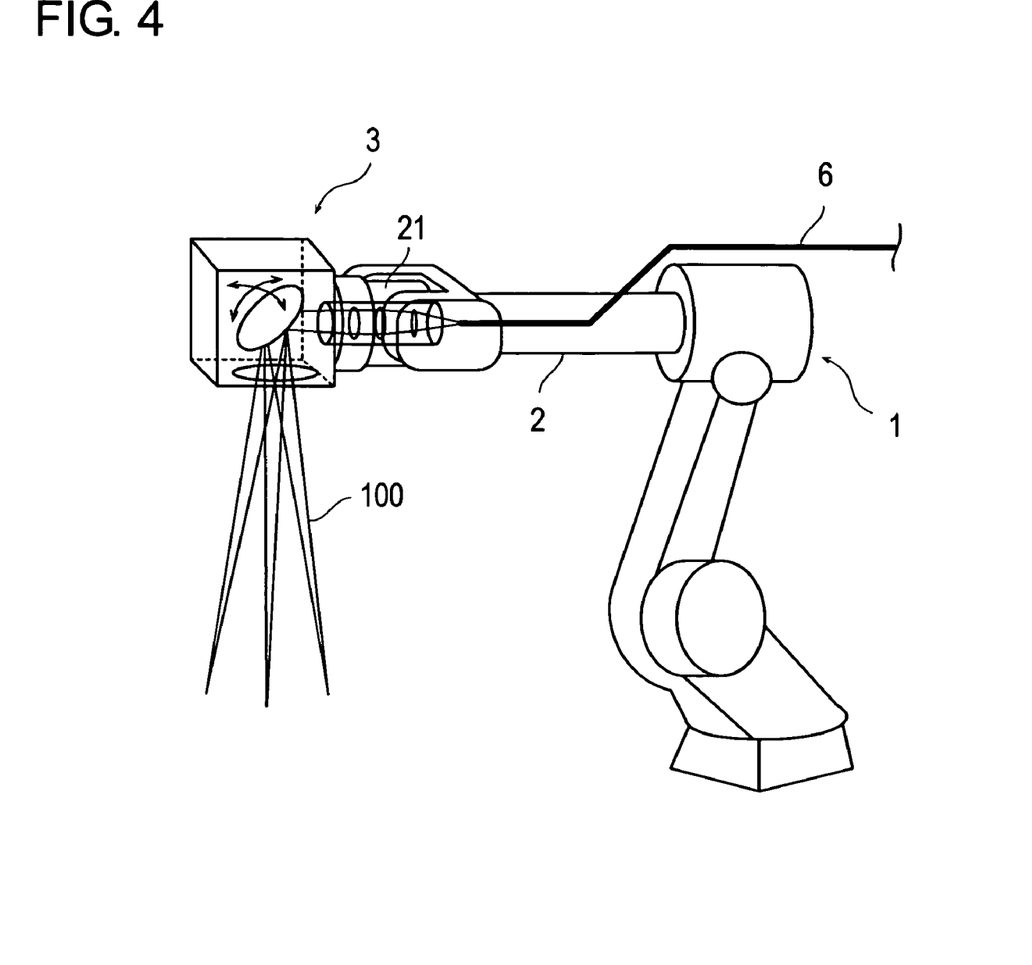
FIG. 4 is a drawing of another example showing how a laser processing head can be mounted on a robot.

FIG. 3 and FIG. 4 are example drawings for showing how a laser processing head 3 can be mounted on a robot 1.

The laser processing head 3 can be mounted on the robot arm by first attaching the laser processing head 3 slightly offset from a wrist portion 21 at the distal end of the robot arm as shown in FIG. 3 and then bringing the optical fiber cable 6 directly to the laser processing head. It can also be mounted by embedding a portion of the laser processing head 3 inside the wrist portion 21 at the distal end of the robot arm and thread the optical fiber cable 6 through the arm 2 of the robot 1 as shown in FIG. 4. Since the shape of the laser processing head 3 can be made more compact in the mounting style shown in FIG. 4, the laser processing head 3 can work inside a complex and confined space, thus broadening the range of applications. Moreover, since the optical fiber cable 6 is threaded through the arm 2, the overall system including the arm assembly is made further compact in this style. Thus, as the mounting of the laser processing head 3 is made more compact, it contributes to broadening of applications of the remote welding in all kinds of welding process, especially automobile body welding processes, and can reduce the needs for hand-held operations in confined areas. Therefore, the present system can improve the work efficiency by simply making the style of mounting the laser processing head 3 more compact.

Such a mounting style can be arbitrarily chosen depending on the shape and type of the robot 1 and the shape of the laser processing head. In other words, the present invention is applicable for mounting styles other than the ones shown here as examples.

Figure 5:
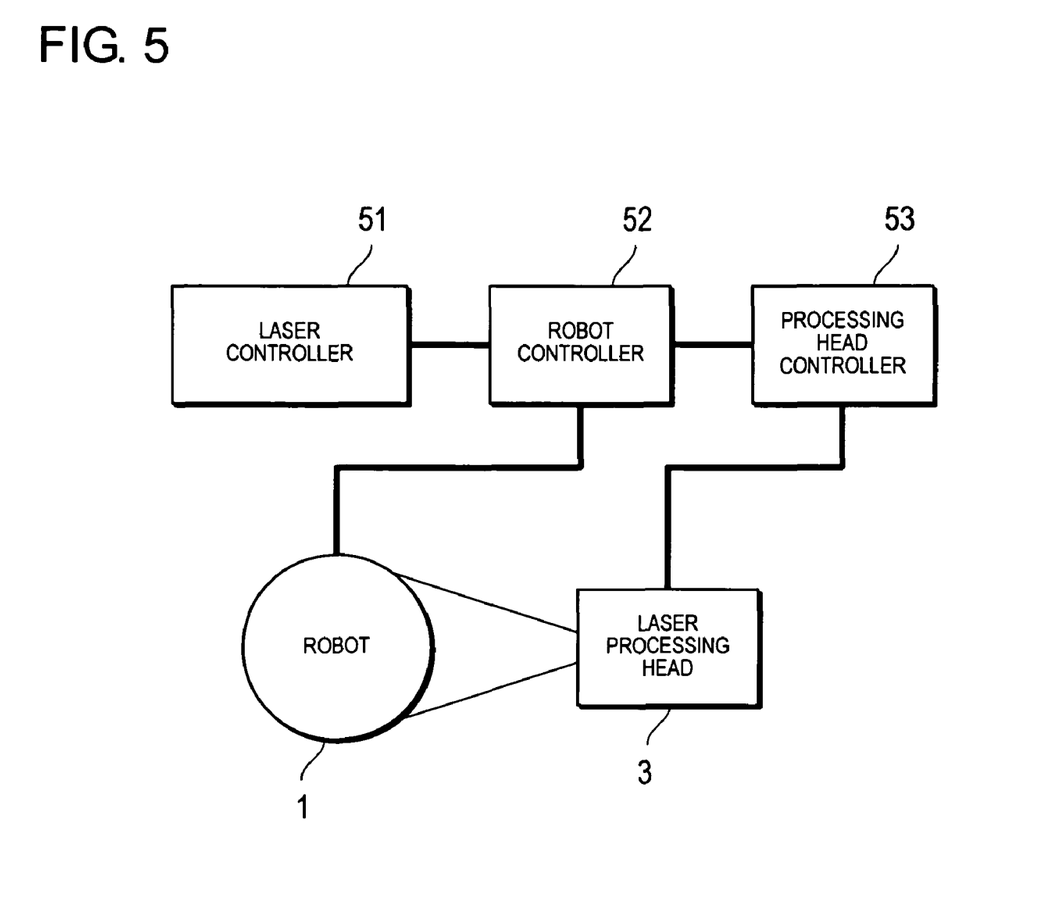
FIG. 5 is a block diagram for describing how said laser welding system is constituted.

FIG. 5 is a block diagram for describing how the laser welding system is constituted.

The control system consists of a laser controller 51 for the laser power on/off control on the laser oscillator 5, a robot controller 52 for controlling the motion of the robot 1, and a processing head controller 53 for controlling the reflection mirror 11 and the lens group 12 on the laser processing head 3, etc.

The laser controller 51 controls the laser power on/off and the laser output intensity, etc. The laser controller 51 turns the laser output on/off in correspondence with the control signal from the robot controller 52.

The robot controller 52 issues control signals for the movement of the robot 1 to be described later, the operations of the reflection mirror 11 and the lens group 12, and the laser power on/off in this embodiment. Therefore, it is the control means of the present invention. The operations of the robot 1 and the reflection mirror 11 are exercised during the operation teaching process of the robot 1. Therefore, the robot controller 52 not only causes the robot to move but also issues various control signals based on the data entered through teaching (teaching data).

The processing head controller 53 controls the motions of the reflection mirror 11 and the lens group 12 built into the laser processing head 3 based on the control signals from the robot controller 52.

The welding method using a laser welding system thus constituted will now be described.

Figure 6:
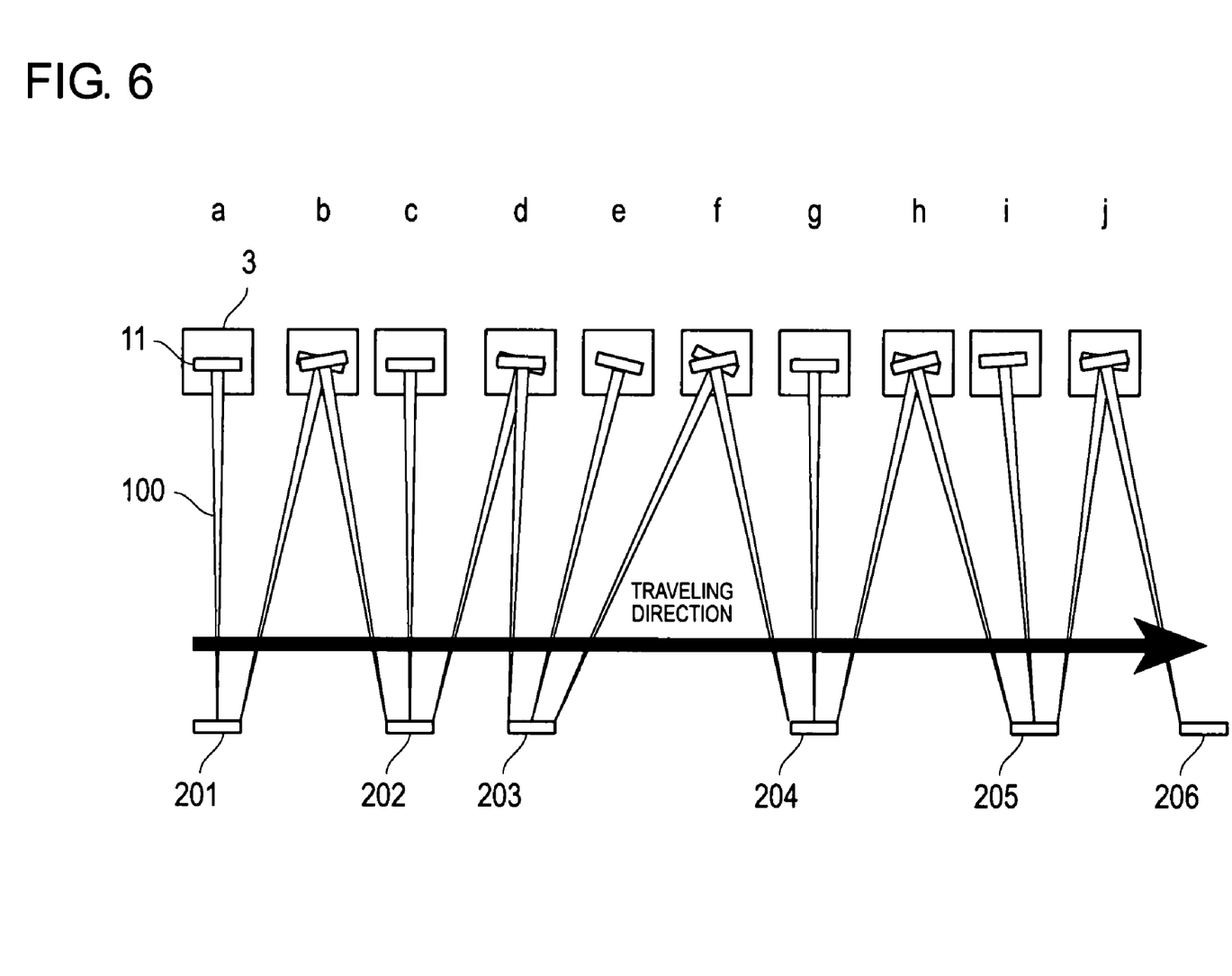
FIG. 6 is a diagram for describing the laser processing head and its motion in the direction of laser irradiation.

FIG. 6 is a diagram for describing the laser processing head 3 and its motion in the direction of laser irradiation in remote welding. In order to make it easily understandable, a very simple basic form will be used as an example in the description.

Assuming that there are multiple welding points 201 through 206 as shown in FIG. 6 in the present embodiment, while the laser beams 100 are focused on a welding point (e.g., 201), the laser processing head 3 is kept moving toward the next welding point (e.g., 202) at a specified speed. During this period, the reflection mirror 11 keeps turning so as to maintain the laser beams 100 focused on the welding point being welded (e.g., 201) while the laser processing head 3 keeps moving until welding of the particular welding point (e.g., 201) is completed.

The motion of the laser processing head 3 is accomplished by the change of the robot's attitude, i.e., the motion of the robot arm 2. The motion of the robot 1 is controlled by the robot controller 52, the laser processing head 3 moves with a constant speed from the current welding point to the next welding point. Therefore, the laser processing head 3 moves from a position "a" to "j" in the diagram with a constant speed.

The purpose for moving the laser processing head 3 with a constant speed is to minimize the robot arm vibration generated due to the motion of the robot arm so that the laser beams 100 be focused as closely as possible on the target (welding point) despite the vibration. The speed of the motion from the position "a" to "j" is kept constant, because non-welding time between the completion of one welding point and the change of the direction of the laser beams to the next welding point is essentially very limited (to be described later) so that the entire welding process from the start to the end can be done in one smooth operation with a constant speed. However, if non-welding time increases, the motion speed of the laser processing head 3 can be modified.

In the meanwhile, while one welding point is being welded, the reflection mirror 11 is turned in such a way that the laser focusing position moves in the direction opposite to the direction of the motion of the laser processing head 3 with a traveling speed approximately equal to that of the laser processing head 3. The turning speed of the reflection mirror 11 at this time is called the specified speed during welding. This makes the laser focusing position moves with a speed approximately equal to that of the laser processing head 3 but in the opposite direction so that the laser beams are focused on the same welding point while it is being welded. The reason that the speeds are approximately equal is that the laser beam irradiation position (focus point) has to move within one welding point depending on the bead forming distance (size of the bead) of the welding point. In other words, the traveling speed of the laser focusing position has to be slightly slower than the traveling speed of the laser processing head 3 in proportion to the bead forming distance so that a bead is formed in the traveling direction of the laser processing head 3.

The traveling speed of the laser processing head 3 has to be faster than the welding speed. This is so that the laser beams can reach the next welding point (e.g., 202) when the welding of one welding point (e.g., 201) is completed.

The laser welding speed is normally 1-5 m/min. On the contrary, the traveling speed of the laser processing head 3 (in other words, the motion speed of the robot arm) is 10-20 m/min at its maximum although it varies with the robot, while the traveling speed of the laser focusing position by means of the reflection mirror 11 can be as fast as 100 m/min at a position 1 meter apart from the reflection mirror 11. Therefore, the traveling speed of the laser processing head 3 can be easily made faster than the welding speed.

In order to select an actual traveling speed from these speeds, it is preferable to select each speed in such a way that the traveling speed of the laser processing head 3 be kept as low as possible so that the vibration of the laser processing head 3 can be held minimum.

The movement of the laser focusing position from one welding point (e.g., 201) to the next welding point (e.g., 202) is implemented by the turning of the reflection mirror 11. It is preferable that the turning of the reflection mirror 11 is done as fast as possible. The laser output does not have to be stopped during this turning. This is due to the fact that even if unwanted parts, regardless of whether they are located within or out of the laser focusing position, are irradiated by the laser beams during the beam's travel from one welding point to another, it occurs in such a short period of time as the traveling speed of the laser focusing position is extremely faster than the welding speed, so that those parts will never be affected by the irradiation of the laser beams 100. It is also possible to stop the laser output during the travel between the welding points, if necessary, by sending the power off signal to the laser controller 51.

As shown above, the position of the laser processing head 3 provided at the distal end of the robot arm travels in the direction of sequential welding the present system by controlling the motion of the laser processing head 3 by means of the robot 1 and the direction of the reflection mirror 11. In other words, the laser processing head 3 is located in front (e.g., position "b") of a welding point (e.g., 202) at the time when welding of the welding point (e.g., 202) starts, and is located beyond (e.g., position "d") the welding point (e.g., 202) when the welding of the welding point (e.g., 202) is completed.

Figure 7:
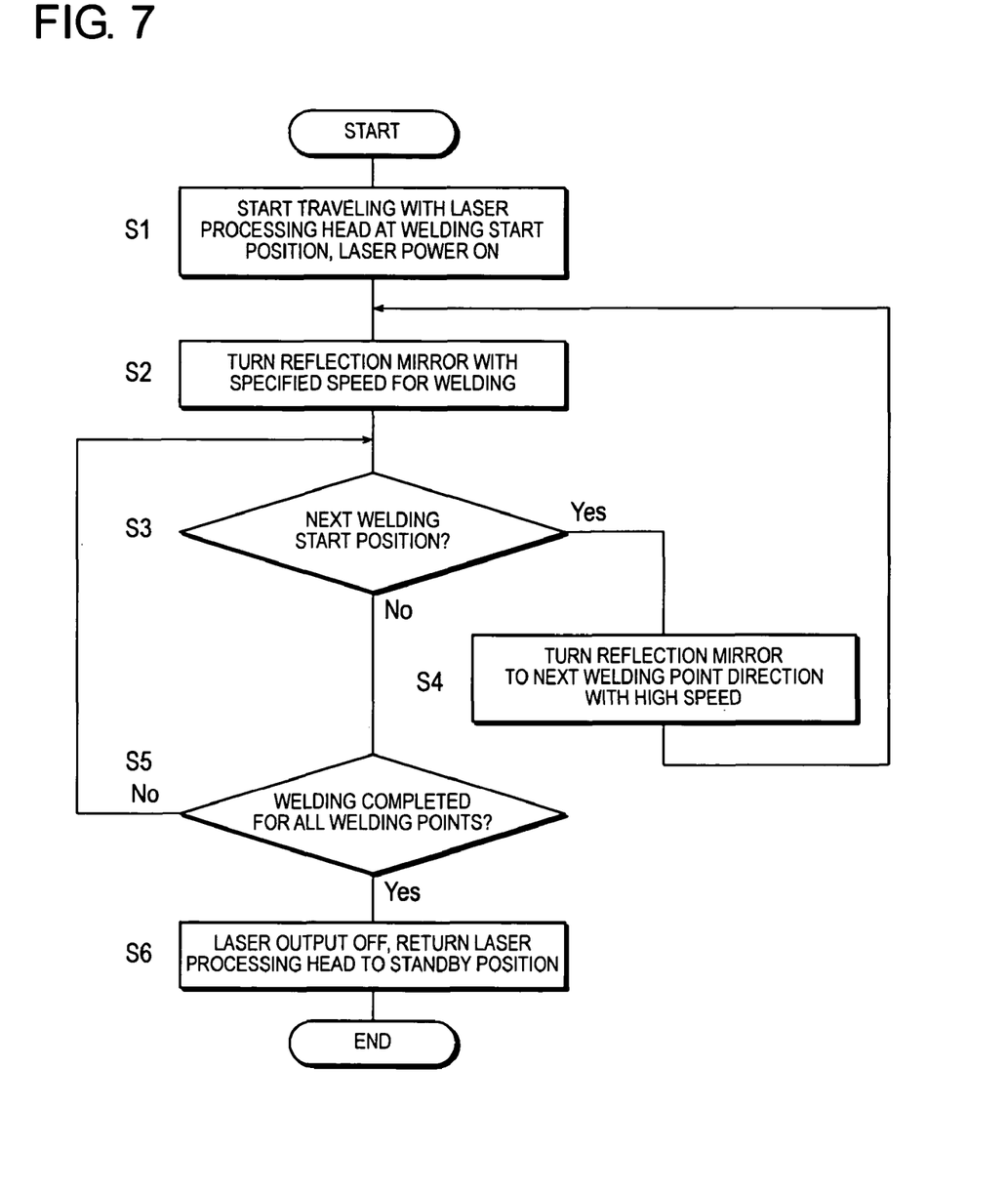
FIG. 7 is a flow chart for showing the sequence of control in remote welding.

FIG. 7 is a flow chart for showing the sequence of control in this remote welding.

First, the robot controller 52 brings the laser processing head 3 to the first welding start position according to the teaching data entered in advance to start it to move it with a constant speed simultaneously and issues a command to the laser controller 51 to turn on the laser output (S1). It also issues a command to the processing head controller 53 to turn the reflection mirror 11 with a speed specified for welding (S2).

Next, the robot controller 52 makes a judgment as to whether or not it has reached the welding start position for the next welding point according to the teaching data (S3). In this case, the welding start position of the next welding point is also the position where the welding of the previous welding point is completed.

At this stage, if it has arrived at the welding start position for the next welding pint, the robot controller 52 orders the processing head controller 53 to turn the reflection mirror 11 in the direction toward the next welding point with a fast speed (S4). Thus, the processing head controller 53 causes the reflection mirror 11 to turn in the direction of the next welding point with a high speed and the laser beams to be irradiated in the direction of the next welding point. This operation is repeated thereafter until the welding of the last welding point is completed.

On the other hand, if it has not reached the welding start position for the next welding point in the step S3, the robot controller 52 further makes a judgment as to whether welding is completed for all the welding points or not (S5). This judgment is to judge as to whether welding of the final welding point according to the teaching data is completed. If it is judged that the welding of the final welding point is not finished yet, it means that the welding work currently in progress is not completed yet, so that the robot controller 52 returns to the step S3 to continue the process of the step S3. This allows the welding work currently in progress to continue.

On the other hand, if the welding of the final welding point is completed in the step S5, the robot controller 52 issues a command to the laser controller 51 to turn off the laser output in accordance with the teaching data, brings back the laser processing head 3 to its standby position (or work completion position, etc.) (S6), and ends the entire job.

Describing the above operation more specifically using an example shown in FIG. 6, the robot controller 52 first brings the laser processing head 3 to the welding start position "a" of the welding point 201, causes the laser processing head 3 to start irradiating the laser output while moving it at a constant speed, and causes the reflection mirror 11 to turn as a specified speed so that the laser beams will irradiate the welding point 201.

Next, the robot controller 52 causes the reflection mirror 11 to turn at the maximum speed as taught in order to direct the laser beams to the welding point 202 when the head has reached the position "b" for starting to weld the welding point 202 (the welding of the welding point 201 is finished at this point). The robot controller 52 causes the system to continue the welding of the welding point 202 at this point. The robot controller 52 repeats these processes thereafter until all the welding is completed ending with the welding of the welding point 206, and stops the laser output when the welding of the welding point 206 is completed, completing the entire welding work.

Incidentally, in welding a plurality of welding points as shown above, there can be a case where the distance from the reflection mirror 11 to the welding point exceeds the focal depth. If in case the distance between the reflection mirror 11 and the welding point exceeds the focal depth, the focal position can be adjusted by means of adjusting the lens group 12. Such an adjustment of the lens group 12 can be set up in advance during the teaching process for the operation of the robot 1 based on the positions of a welding point and the laser processing head 3 (their relative distance). In case of a laser processing head 3 equipped with an automatic focusing function, there is no need for an adjustment by the lens group 12 and the task is handled by the automatic focusing function.

Let us compare here the remote welding according to the abovementioned embodiment and the remote welding by means of keeping the laser processing head 3 stationary.

Figure 8:
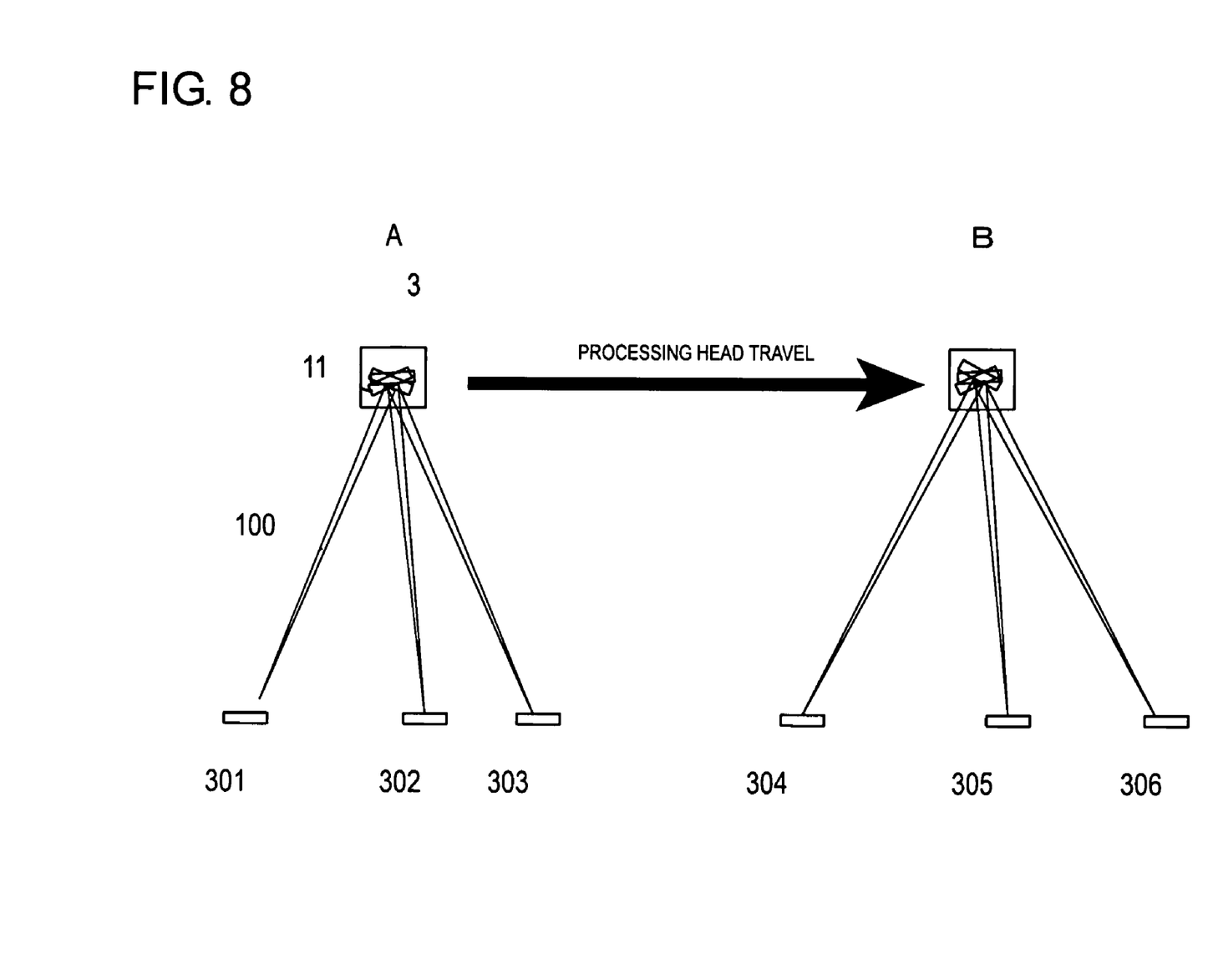
FIG. 8 is a diagram for describing the motion of remote welding according to the prior art method.

FIG. 8 is a diagram for describing a remote welding process without fully utilizing the laser processing head 3.

In conducting a remote welding process by means of keeping the laser processing head 3 stationary, the laser processing head 3 is stopped when the laser processing head 3 reaches the position "A" and conducts from there the welding of the welding points 301, 302, and 303, which are located within a range that can be irradiated with laser beams using the reflection mirror 11, continuously by turning the reflection mirror 11. After the welding point 303 is finished, the system stops the emission of the laser beams temporarily, moves the laser processing head 3 from the position A to the position B, and stops the laser processing head 3 when it reaches the position B. The system then conducts welding of the welding points 304, 305, and 306 continuously by keeping the laser processing head 3 stationary at the position B and turning the reflection mirror 11.

Figure 9:
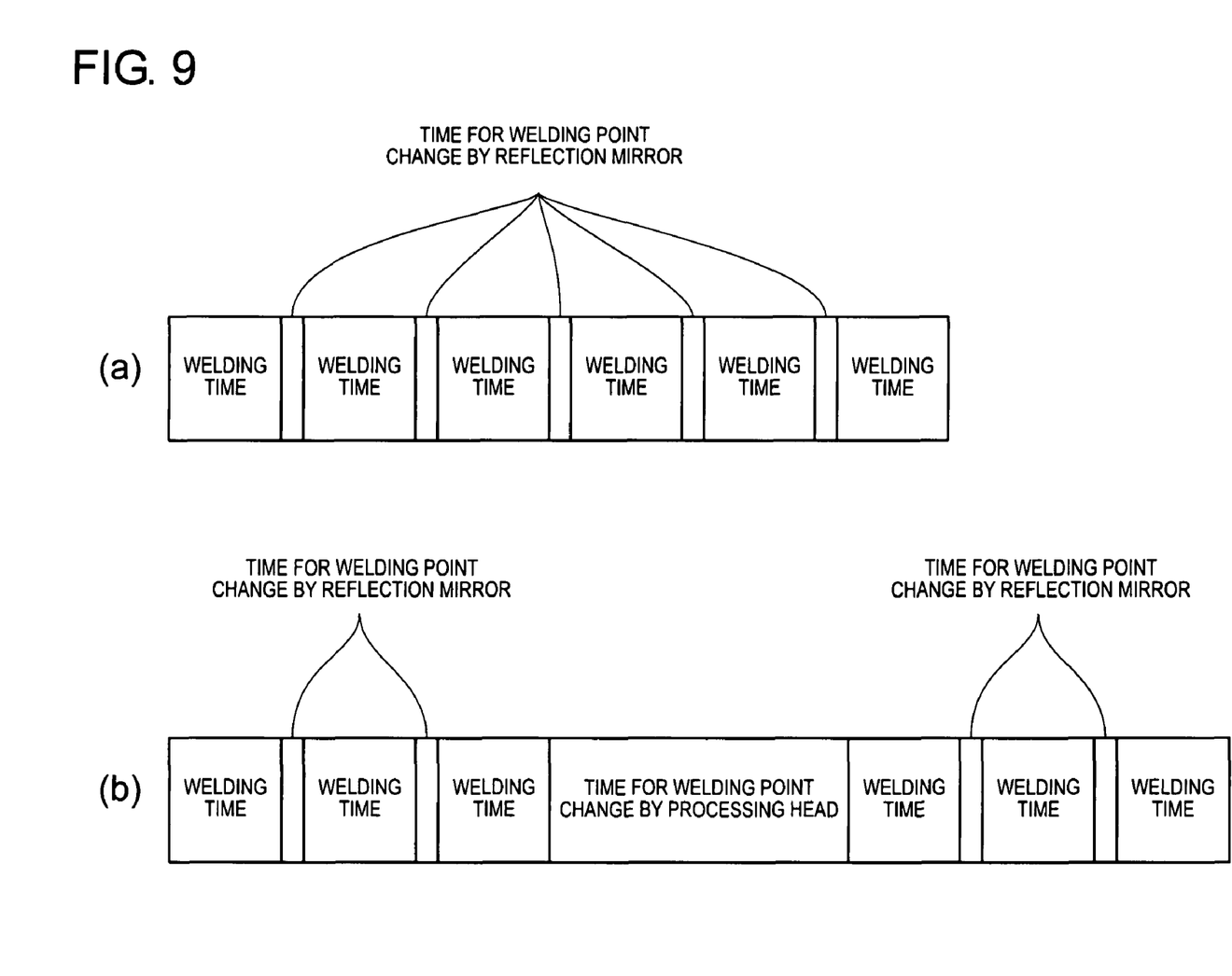
FIG. 9 is a diagram for comparing the time required for the entire welding process between the welding operation according to the embodiment and the welding operation according to the prior art method.

FIG. 9 is a diagram for comparing the time required for the entire welding process between the welding operation according to the abovementioned embodiment as shown in FIG. 6 and the remote welding by means of keeping the laser processing head 3 stationary as shown in FIG. 8. In FIG. 9, (a) represents the method according to the present embodiment, while (b) represents the remote welding by means of keeping the laser processing head 3 stationary. The time periods shown here are for the purpose of graphical representation only and do not reflect the actual time periods.

As shown here, in case when the remote welding is performed maintaining the laser processing head 3 stationary, a certain welding point change time is required for stopping the welding process temporarily and moving the laser processing head 3 (see "welding point change time for the processing head" in the figure). On the contrary, no such welding point change time is required in case of the present embodiment. Therefore, the total welding time in the present embodiment is shorter by the amount of the welding point change time, which is not required.

Consequently, the more the welding points are, the more conspicuous this time saving effect becomes. For example, there are several hundreds of welding points in a typical automobile body assembly line, so that a substantial time saving effect can be expected if not all but even a portion of these welding points are welded by the method proposed by this invention.

As can be seen from the above description, the time for stopping the welding process and moving the robot arm to change the welding point is not required in the present system as the laser processing head 3 mounted on the robot arm keeps moving in the direction toward the next welding point during welding. Therefore, the present system can reduce the total welding time by the amount of time made unnecessary as described above. The more the welding points are, the more conspicuous this time saving effect becomes. For example, there are several hundreds of welding points in a typical automobile body assembly line, so that a substantial time saving effect can be expected if not all but even a portion of these welding points are welded by the method proposed by this invention.

Moreover, the robot arm is moved at a constant speed at least during the welding process in the present system. Therefore, the laser beam focal position does not stray away from a welding point due to vibrations of the robot arm, which is in motion during the welding process in the present system.

Moreover, the present system makes it possible to move the laser processing head 3 to be securely in a range that enables it to weld the next welding point with the turning of the reflection mirror 11 by increasing the traveling speed of the laser processing head 3 sufficiently faster than the welding speed. By doing so, the present system can almost completely eliminate the non-welding time during the continuous welding of multiple welding points. The present system makes it possible to have the next welding point more securely within a range covered by turning the reflection mirror 11 by causing the position of the laser processing head 3 to be in front of the target welding point at the time of the start of welding the particular point and be beyond the target welding point at the end of the welding.

Thus, the present embodiment can almost entirely eliminate the non-welding time, so that it can contribute to the recovery of the cost of investing in a laser welding system including the laser oscillator 5 which is still rather expensive by eliminating the non-welding time almost entirely.

Moreover, it used to waste the laser energy in a system having a single laser oscillator 5 supplying laser beams to a plurality of laser processing heads 3, as it was necessary to keep supplying the laser beams even if one of the laser processing head 3 is in a non-welding period for changing the welding position, directing the laser beams into laser absorbing materials in vain, but the present embodiment eliminates the non-welding time almost entirely so that the waste of electric power due to wasteful absorption of laser energy can be eliminated as well.

The embodiments described in the above are not to be construed to limit the invention. For example, although the laser irradiation direction is controlled by turning the reflection mirror 11 in the above embodiment, it can also be constituted in such as way that the reflection mirror 11 is held stationary while turning the laser processing head 3 itself, thus changing the direction of the reflection mirror 11 together with the laser processing head 3.

Also, although the reflection mirror 11 is designated as the final laser beam irradiation means in the embodiment above, it can be constituted to direct the optical fiber cable 6 from inside the laser processing head toward the welding point directly and to change the angle of the distal end of the optical fiber cable 6. In this case, it is possible to change only the angle of the distal end of the optical fiber cable 6 in changing its direction, it can also be constituted to change the angle by turning the laser processing head 3 as a whole.

Although the above descriptions of the embodiments assumed a basic form where a plurality of welding points is arranged in a straight line (FIG. 6), the present application can be applied to any other motion passages other than such a straight line arrangement.

Furthermore, the present invention is not limited to the embodiments described above.

This application is based on Japanese Patent Application No. 2004-364079 filed on Dec. 15, 2004, the contents of which are hereby incorporated by reference.

What is claimed is:

1. A control method for laser welding comprising:

moving a laser processing head mounted on a robot in a direction from a first welding point to a second welding point differing from the first welding point at a constant speed, wherein said laser processing head has a reflection mirror which changes a laser beam irradiation direction toward said first welding point and a speed of laser beam irradiation position, irradiating the laser beam toward the first welding point by turning said reflection mirror so that a laser focusing position moves in a direction opposite to a direction of motion of said laser processing head, wherein a traveling speed of the laser focusing position is slower than a traveling speed of the laser processing head in proportion to a bead forming distance of said first welding point, and changing the laser beam irradiation direction from the first welding point to the second welding point by turning said reflection mirror after finishing welding of said first welding point, wherein the traveling speed of the laser focusing position is faster than the traveling speed of the laser processing head when forming a weld bead, wherein said reflection mirror is configured to be turned about an X-axis and a Y-axis that intersects perpendicularly with a Z-axis, which is an axis perpendicular to a surface of the reflection mirror.

2. A control method for laser welding as claimed in claim 1, wherein said moving causes a position of the laser processing head to be in front of a welding point comprising the first welding point and the second welding point when starting the welding and to be beyond the welding point when the welding is finished at the welding point relative to a specified direction.

3. A control method for laser welding as claimed in claim 1, wherein the first welding point and the second welding point are spaced apart and separated from one another such that there is an area where there are no workpieces to be welded between the first welding point and the second welding point.

* * * * *